(No Model.)
M. E. TISDALE.
EGG BOILER AND CASTER.
No. 318,523. Patented May 26, 1885.
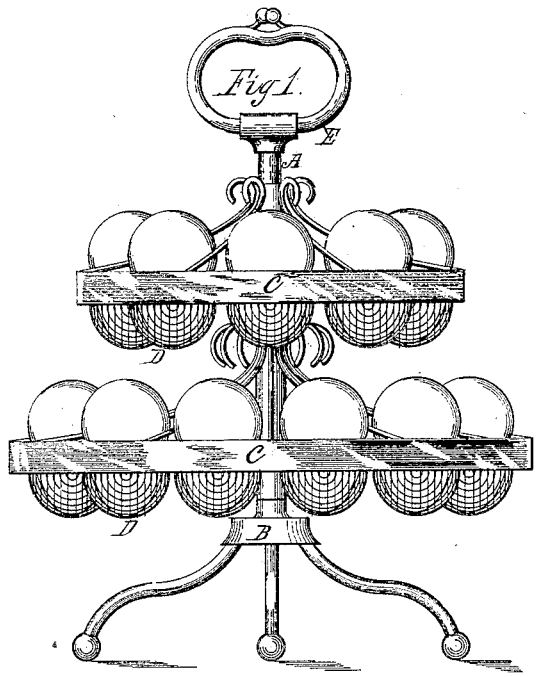
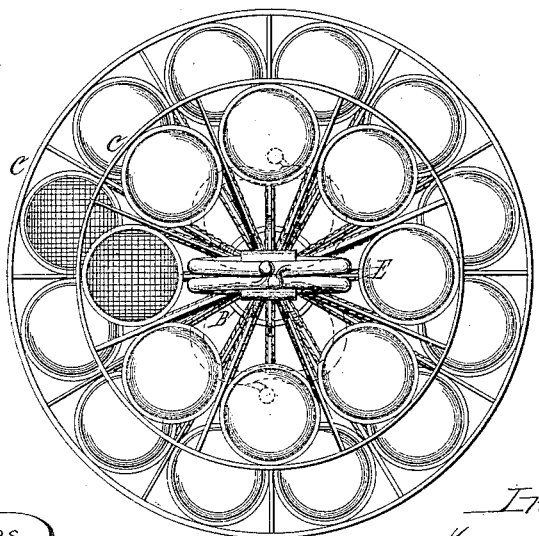
Witnesses.
Inventor
Mary E. Tisdale,
By Justus M. St. John,
Her Atty.

UNITED STATES PATENT OFFICE.

MARY E. TISDALE, OF CEDAR RAPIDS, IOWA.

EGG BOILER AND CASTER.

SPECIFICATION forming part of Letters Patent No. 318,523, dated May 26, 1885.

Application filed September 29, 1884. (No model.)

*To all whom it may concern:*

Be it known that I, MARY E. TISDALE, a citizen of the United States, residing at Cedar Rapids, in the county of Linn and State of Iowa, have invented certain new and useful Improvements in Egg Boilers and Casters, of which the following is a specification.

The object of my invention is to facilitate the boiling and serving of eggs; and the invention consists in a stand or caster provided with a number of perforated pockets or receptacles, into which the eggs are individually placed to be boiled and served, the device being adapted to be set in a cooking-vessel bodily and lifted out when the eggs are done and placed on the table, where it forms a convenient and attractive article of table-furniture.

In the accompanying drawings, forming a part of this specification, Figure 1 represents an elevation of the invention, and Fig. 2 a plan view of the same.

Similar letters of reference indicate corresponding parts.

The invention partakes of the nature of an ordinary caster in some of its general features.

To a central stem, A, mounted on a base, B, having a broad supporting-surface or widely-extended feet, is attached a wheel or disk, C, having around its circumference a series of holes or rings corresponding in size to an ordinary egg. Extending downward from these holes and connected with them are semi-spherical or semi-elliptical pockets D D, which receive the eggs. These pockets are profusely perforated, so as to give the water free access to all parts of the eggs in boiling, and are preferably made of wire, as indicated in the drawings. For the same purpose the whole device is preferably made open in design, and may be constructed of wire and sheet metal, as shown. This also combines lightness with strength, and there being no broad surfaces to retain water, it dries quickly when removed therefrom. To protect it from rust it may be galvanized, and to render it very attractive and durable may be nickel-plated.

The device may be of various sizes, according to the number of eggs required at any time. For symmetry, as well as economy of space, it may be provided with two ledges, as shown, or more, if desired. These are preferably made free to revolve around the stem, as in the ordinary caster. In the pattern represented radial arms composed of threefold-twisted wires extend outward from the nave, to which they are secured, and when near the encircling outer rim divide, two of the wires helping to form the ring of the egg-pockets, and the other returning at a different angle to the nave, so as to aid in supporting the weight. The design may of course be varied according to the taste of the maker.

In order that the stem may not extend above the top of the cooking-vessel, the carrying-ring E is made so as to turn down when required, as indicated by the dotted lines in Fig. 2. A single ring may be used, or the double one suitably hinged and adapted to lock together, substantially as shown.

The utility of the invention will be readily seen. To place a large number of eggs in a pot and remove them therefrom singly is an operation requiring considerable time and care. In consequence it is almost impossible to boil the eggs uniformly, those last removed being cooked harder than the others. By the use of this invention the eggs are put in the water and removed simultaneously, and the cooking is therefore as uniform as it can possibly be, while the time and labor consumed are insignificant. The beauty and appropriateness of the caster for table use will also be apparent.

I am aware that egg-stands adapted to hold the eggs in boiling and for table use are not broadly new, and I do not therefore claim such as my invention; but What I do claim, and desire to secure by Letters Patent, is—

In a combined egg boiler and caster, the ledges having egg-holding cups substantially conforming to one-half the egg, in combination with a central stem mounted on a suitable base, and having at its upper end a handle or ring adapted to turn down for the purpose of reducing the height, substantially as shown and described.

In testimony whereof I affix my signature in presence of two witnesses.

MARY E. TISDALE.

Witnesses:
 J. M. ST. JOHN,
 A. B. DENNIS.